United States Patent
Kinoshita et al.

(10) Patent No.: US 8,253,386 B2
(45) Date of Patent: Aug. 28, 2012

(54) METHOD OF CONTROLLING CHARGE AND DISCHARGE OF NON-AQUEOUS ELECTROLYTE SECONDARY CELL

(75) Inventors: Akira Kinoshita, Kobe (JP); Shingo Tode, Kobe (JP); Yasufumi Takahashi, Kobe (JP); Hiroyuki Fujimoto, Kobe (JP); Ikuro Nakane, Kobe (JP); Shin Fujitani, Kobe (JP)

(73) Assignee: SANYO Electric, Co., Ltd., Osaka (JP)

( * ) Notice: Subject to any disclaimer, the term of this patent is extended or adjusted under 35 U.S.C. 154(b) by 2060 days.

(21) Appl. No.: 10/934,705

(22) Filed: Sep. 7, 2004

(65) Prior Publication Data
US 2005/0052157 A1 Mar. 10, 2005

(30) Foreign Application Priority Data
Sep. 8, 2003 (JP) .................. 2003-315137

(51) Int. Cl.
*H02J 7/00* (2006.01)
*H03K 17/28* (2006.01)
*H01M 4/13* (2010.01)

(52) U.S. Cl. ........ 320/149; 320/137; 320/138; 320/155; 320/160; 327/392; 327/393; 327/394; 327/536; 429/231.4; 429/231.8; 429/231.9; 429/231.95

(58) Field of Classification Search ............. 320/148
See application file for complete search history.

(56) References Cited

U.S. PATENT DOCUMENTS

| | | | |
|---|---|---|---|
| 6,051,955 A | 4/2000 | Saeki et al. | 320/121 |
| 6,208,117 B1 * | 3/2001 | Hibi | 320/134 |
| 6,340,880 B1 | 1/2002 | Higashijima et al. | 320/162 |
| 6,396,246 B2 | 5/2002 | Haraguchi et al. | |
| 6,465,131 B1 * | 10/2002 | Kusumoto et al. | 429/231.1 |
| 6,492,791 B1 | 12/2002 | Saeki et al. | 320/135 |

FOREIGN PATENT DOCUMENTS
JP 04-300153 * 9/1993
(Continued)

OTHER PUBLICATIONS

Yoshio, Masaki et al., "Preparation and properties of $LiCo_yMn_xNi_{1-x-y}O_2$ as a cathode for lithium ion batteries," *Journal of Power Sources*, 2000, vol. 90, pp. 176-181.

Lu, Zhonghua et al., "Layered $Li[Ni_xCo_{1-2x}Mn_x]O_2$ Cathode Materials for Lithium-Ion Batteries," *Electrochemical and Solid-State Letters*, 2001, vol. 4, No. 12, pp. A200-A203.

(Continued)

*Primary Examiner* — Yalkew Fantu
(74) *Attorney, Agent, or Firm* — Kubovcik & Kubovcik

(57) ABSTRACT

Capacity degradation due to charge/discharge cycles is suppressed in either a non-aqueous electrolyte secondary cell provided with a positive electrode including, as a positive electrode active material, a lithium-transition metal complex oxide having a layered structure and containing at least Ni and Mn as transition metals, and a negative electrode containing a carbon material as a negative electrode active material and having a higher initial charge-discharge efficiency than that of the positive electrode, or an assembled battery having a plurality of cells each of which is the secondary cell. A control circuit incorporated in the secondary cell or the assembled battery, or in an apparatus using the secondary cell or the assembled battery, monitors the voltage of the secondary cell or each of the cells in the assembled battery so that the end-of-discharge voltage of each cell is 2.9 V or higher.

15 Claims, 4 Drawing Sheets

FOREIGN PATENT DOCUMENTS

| | | |
|---|---|---|
| JP | 5-290890 A | 11/1993 |
| JP | 7-153494 | 6/1995 |
| JP | 2561556 B2 | 9/1996 |
| JP | 3244314 B2 | 10/2001 |
| JP | 2002-42813 A | 2/2002 |
| JP | 2002-044875 A | 2/2002 |
| JP | 2002-176108 A | 6/2002 |
| JP | 2003-17052 A | 1/2003 |

OTHER PUBLICATIONS

Koyama, Yukinora et al., "Lithium Insertion Material of $LiCo_{1/3}Ni_{1/3}Mn_{1/3}O_2$ for Advanced Batteries; (I) Prediction on the Crystal and Electronic Structure" *The $42^{nd}$ Battery Symposium in Japan, Abstracts*, 2001, pp. 50-51.

* cited by examiner

2: protection circuit

3: control circuit

4: charge control switch

5: discharge control switch

2: protection circuit

3: control circuit

4: charge control switch

5: discharge control switch

11: working electrode

12: counter electrode

13: reference electrode

14: electrolyte solution

METHOD OF CONTROLLING CHARGE AND DISCHARGE OF NON-AQUEOUS ELECTROLYTE SECONDARY CELL

BACKGROUND OF THE INVENTION

1. Field of the Invention

The present invention relates to methods of controlling charge and discharge of non-aqueous electrolyte secondary cells such as lithium secondary cells.

2. Description of Related Art

A cell that has in recent years drawn attention as having a high energy density is a non-aqueous electrolyte secondary cell in which the negative electrode active material is composed of metallic lithium, an alloy or carbon material that is capable of intercalating and deintercalating lithium ions and the positive electrode active material is composed of a lithium-transition metal complex oxide represented by the chemical formula $LiMO_2$ (where M is a transition metal).

A representative example of the lithium-transition metal complex oxide is lithium cobalt oxide ($LiCoO_2$), which has already been in commercial use as a positive electrode active material for non-aqueous electrolyte secondary cells.

Materials containing Mn as a transition metal and those containing Ni as a transition metal have also been researched, and materials containing all of Mn, Ni, and Co have been actively researched. (See, for example, Japanese Patent Nos. 2561556 and 3244314; and Journal of Power Sources, 90 (2000) pp. 176-181).

It has also been reported in Electrochemical and Solid-State Letters, 4(12) A200-A203 (2001), for example, that among the lithium-transition metal complex oxides containing Mn, Ni, and Co, a material represented by the chemical formula $LiMn_xNi_xCo_{(1-2x)}O_2$, in which the contents of Mn and Ni are equal, shows exceptionally high thermal stability even in a charged state (high oxidation state).

Japanese Unexamined Patent Publication No. 2002-42813 reports that a complex oxide containing Ni and Mn at substantially equal amounts shows a voltage of about 4 V, which compares with $LiCoO_2$, and exhibits high capacity and good charge-discharge efficiency.

A cell employing a positive electrode using as its main material (50 weight % or more) such a lithium-transition metal complex oxide containing Mn, Ni, and Co and having a layered structure (for example, the one represented by the chemical formula $Li_aMn_bNi_bCo_{(1-2b)}O_2$ ($0 \leq a \leq 1.2$, $0 < b \leq 0.5$)) is expected to improve cell reliability remarkably because such a cell has high thermal stability during charge.

Nevertheless, through a study on cell charge-discharge performance, it was found that a cell in which the positive electrode active material is such a lithium-transition metal complex oxide containing Mn, Ni, and Co and having a layered structure and the negative electrode is made of a material having a higher initial charge-discharge efficiency than that of the positive electrode active material, such as graphite, shows a significantly inferior performance to a conventionally-used cell adopting lithium cobalt oxide for the positive electrode.

As for the charge-discharge conditions for non-aqueous electrolyte secondary cells using the above-noted lithium-transition metal complex oxide as a positive electrode active material and a carbon material as a negative electrode active material, Japanese Unexamined Patent Publication No. 2002-42813, for example, discloses that the end-of-charge voltage should be 4.2 V and the end-of-discharge voltage should be 2.5 V.

Also, Japanese Unexamined Patent Publication No. 2003-17052 discloses that the end-of-charge voltage should be 4.2 V and the end-of-discharge voltage should be 2.0 V. Further, Japanese Unexamined Patent Publication No. 7(1995)-153494 describes in paragraph [0015] that generally the end-of-discharge voltage should be 2.0 V for a non-aqueous electrolyte secondary cell adopting a similar complex oxide containing Ni and Co as the positive electrode active material and a carbon material for the negative electrode. From these descriptions, it is thought that the end-of-discharge voltage for cells that use a lithium-transition metal complex oxide containing Ni as the positive electrode and a carbon material as the negative electrode is about 2.0-2.5 V.

To date, as an example of a method for improving the charge-discharge cycle performance of a non-aqueous electrolyte secondary cell that uses as the positive electrode active material a complex oxide containing Li, Ni, and Co and having a layered structure, Japanese Unexamined Patent Publication No. 5(1993)-290890, for example, has proposed that the capacity ratio of the positive electrode and the negative electrode during charge should be set so that the range of x in $Li_xMO_2$ (where M is Co and/or Ni) of the positive electrode falls within the range $0.35 \leq x \leq 0.9$. (Note that the value x decreases during charge and increases during discharge.) Paragraph [0009] of Japanese Unexamined Patent Publication No. 5(1993)-290890 describes that in this case, the use of $Li_xMO_2$ having such a composition range can suppress destruction of the structure of the positive electrode active material resulting from charge/discharge cycles.

Nevertheless, it has been found that cells that use the lithium-transition metal complex oxide containing Mn, Ni, and Co as the positive electrode active material show remarkably poor charge-discharge cycle performance although the value x (lithium content) during charge and discharge falls within the range specified in Japanese Unexamined Patent Publication No. 5(1993)-290890, and this method is incapable of attaining sufficient advantageous effects.

Further, Japanese Unexamined Patent Publication No. 7(1995)-153494 discloses that although using a complex oxide containing Ni and Co and having a layered structure as a positive electrode active material, an increase in the potential of the negative electrode in the final stage of discharge of a cell is suppressed by reducing the initial charge-discharge efficiency of the positive electrode to be lower than the initial charge-discharge efficiency of the negative electrode, thereby suppressing decomposition of the electrolyte solution on the negative electrode surface. However, with the above-described cell that uses a lithium-transition metal complex oxide containing Mn, Ni, and Co as a positive electrode active material, the initial charge-discharge efficiency of its positive electrode is lower than the initial charge-discharge efficiency of the graphite negative electrode. Therefore, although the potential of the negative electrode does not increase in the final stage of discharge of the cell, its charge-discharge cycle performance is remarkably poor, and it has been found that a sufficient effect cannot be attained even when degradation in the negative electrode side is suppressed.

BRIEF SUMMARY OF THE INVENTION

Accordingly, it is an object of the present invention to provide a method of controlling charge and discharge of a non-aqueous electrolyte secondary cell comprising a positive electrode containing, as a positive electrode active material, a lithium-transition metal complex oxide having a layered structure and containing at least Ni and Mn as transition metals, and a negative electrode containing a carbon material as a negative electrode active material and having an initial charge-discharge efficiency higher than that of the positive electrode, or an assembled battery having a plurality of cells each being the non-aqueous electrolyte secondary cell, the method being capable of suppressing capacity degradation due to charge-discharge cycles.

In order to accomplish the foregoing and other objects, the present invention provides a method of controlling charge and discharge of either a non-aqueous secondary cell comprising a positive electrode including a positive electrode active material containing a lithium-transition metal complex oxide having a layered structure and containing at least Ni and Mn as transition metals, and a negative electrode containing a carbon material as a negative electrode active material and having an initial charge-discharge efficiency higher than that of the positive electrode, or an assembled battery having a plurality of cells each being the secondary cell, the method comprising: controlling discharge of the secondary cell or each of the cells in the assembled battery so that the end-of-discharge voltage of the secondary cell or each of the cells is 2.9 V or higher.

According to the present invention, capacity degradation due to charge/discharge cycles can be suppressed. Consequently, charge-discharge cycle performance can be improved.

As will be shown in the later-described Experiment 2, with a non-aqueous electrolyte secondary cell using as a positive electrode active material a lithium-transition metal complex oxide having a layered structure and containing Ni and Mn, the XRD (X-ray diffraction) pattern of the positive electrode taken out of a cell after charge/discharge cycles showed no substantial change that indicates capacity degradation; thus, it was found that no crystal destruction occurred in the bulk of the positive electrode active material. In addition, neither Ni nor Co was detected from the negative electrode taken out of the cell after charge/discharge cycles, but a large amount of Mn was detected therefrom. From these facts, it is presumed that deterioration of active material developed because of the mechanism described below.

Since the lithium-transition metal complex oxide containing Ni and Mn and having a layered structure shows lower initial charge-discharge efficiency than the carbon negative electrode, the potential of the positive electrode greatly reduces in the final stage of discharge of the cell. Generally, it is believed that in a compound represented by the formula $Li_aMn_bNi_bCo_{(1-2b)}O_2$ (where $0 \leq a \leq 1.2$ and $0 < b \leq 0.5$), the oxidation number of Mn is +4 ($Mn^{4+}$) and the oxidation state of Mn does not change during charge and discharge (cf. Proceedings of the 42nd Battery Symposium in Japan, pp. 51-52, etc.). However, it is believed that when the potential of the positive electrode greatly reduces as described above, part of $Mn^{4+}$ in the positive electrode is reduced into $Mn^{3+}$, which is unstable, and $Mn^{3+}$ causes disproportionation, forming $Mn^{4+}$ and $Mn^{2+}$. It is thought that because $Mn^{2+}$ tends to form a complex compound with, and dissolve into, the solvent that constitutes the electrolyte solution easily, it dissolves from the positive electrode surface into the solvent and deposits on the negative electrode. It is presumed that due to such dissolution of Mn from the positive electrode surface, the crystal structure of the surface deteriorates, and as a result, the resistance at the interface between the positive electrode and the electrolyte solution increases, causing the capacity degradation.

It is thought that by controlling the end-of-discharge voltage of the secondary cell or each of the cells in the assembled battery to be 2.9 V or higher in accordance with the present invention, the decrease of the positive electrode potential in the final stage of discharge is suppressed; as a result, the dissolution of Mn can be suppressed and the capacity deterioration can be lessened, leading to a remarkable improvement in charge-discharge cycle performance.

In the present invention, it is possible that with the non-aqueous electrolyte secondary cell or the assembled battery having a plurality of cells each being the secondary cell, a control circuit that is incorporated in the secondary cell or each of the cells in the assembled battery, or in an apparatus using the cell/battery, monitors the voltage of the secondary cell or each of the cells in the assembled battery and controls the charge and discharge of the cell/battery so that the end-of-discharge voltage of each cell is 2.9 V or higher.

Generally, charging and discharging of a battery is controlled by a control circuit. As described above, the control circuit may be incorporated either in the battery, or in an apparatus using the battery as its energy source. Meanwhile, in order to ensure safety at the time of malfunctions on the apparatus side, the battery is usually provided with a protection circuit. The protection circuit monitors voltage, temperature, and the like of the battery. The protection circuit has a function to protect the battery from overdischarging, so it prevents the battery from being discharged excessively. In many conventional lithium secondary batteries that use a lithium cobalt oxide as the positive electrode active material and a graphite material as the negative electrode active material, the overdischarge-detection voltage is usually set at about 2.0 V to 2.5 V.

The present invention also provides a charge-discharge controlling device for controlling charge and discharge of either a non-aqueous secondary cell including a positive electrode composed of a positive electrode active material containing a lithium-transition metal complex oxide having a layered structure and containing at least Ni and Mn as transition metals, and a negative electrode containing a carbon material as a negative electrode active material and having an initial charge-discharge efficiency higher than that of the positive electrode, or an assembled battery having a plurality of cells each being the secondary cell, the charge-discharge controlling device comprising: a charge control switch for starting or ending charge of the secondary cell or each of the cells in the assembled battery; a discharge control switch for starting or ending discharge of the secondary cell or each of the cells in the assembled battery; and a control circuit, incorporated in the secondary cell or assembled battery, or in an apparatus using the secondary cell or assembled battery, for supplying a signal to the discharge control switch such that an end-of-discharge voltage of the secondary cell or each of the cells in the assembled battery is 2.9 V or higher.

It is preferable that the charge-discharge controlling device of the present invention be provided with a protection circuit for preventing overdischarge of the secondary cell or the assembled battery. In addition, it is preferable that with the protection circuit, an overdischarge-detection voltage for the secondary cell or for each of the cells in the assembled battery is set to be a value equal to or lower than the end-of-discharge voltage controlled by the control circuit and equal to or higher than 2.9 V.

It is preferable that the control circuit control the discharge of each of the cells when the control circuit monitors the voltage of each of the cells in the assembled battery.

If the control circuit is the one that monitors an overall voltage of the assembled battery, the overdischarge-detection voltage of the protection circuit for each of the cells in the assembled battery may be set at 2.9 V or higher so that the end-of-discharge voltage of each cell results in 2.9 V or higher.

In the present invention, it is preferable that the lithium-transition metal complex oxide further contain cobalt. Specifically, it is preferable that the lithium-transition metal complex oxide contain Ni, Mn, and Co as transition metals. It is preferable that such a lithium-transition metal complex oxide be represented by the chemical formula $Li_aMn_xNi_yCo_zO_2$, wherein a, x, y, and z satisfy $0 \leq a \leq 1.2, x+y+z=1, 0<x \leq 0.5, 0<y \leq 0.5$, and $z \geq 0$.

Furthermore, in the present invention, it is preferable that the lithium-transition metal complex oxide contain Ni and Mn at substantially equimolar amounts. The term "substantially equimolar amounts" herein means that x and y in the foregoing chemical formula satisfy the following equations:

$$0.45 \leq x/(x+y) \leq 0.55; \text{ and}$$

$$0.45 \leq y/(x+y) \leq 0.55.$$

Nickel has such properties that lead to a large cell capacity but low thermal stability during charge, whereas manganese has such properties that lead to a small capacity but high thermal stability during charge. Accordingly, when a lithium-transition metal complex oxide contains these elements at substantially equimolar amounts, it is possible to obtain their properties in a desirable balance.

In the present invention, it is preferable that the carbon material serving as a negative electrode active material be a graphite material. In the present invention, even when a graphite material is used as the negative electrode material, the potential of the negative electrode does not increase because the voltage of the cell decreases as the positive electrode potential decreases in the final stage of discharge when ending the discharge. Use of a graphite material in such a condition can make full use of excellent reversibility of the graphite material.

The solvent of the non-aqueous electrolyte used in the present invention may be any solvent that has conventionally been used as a solvent for an electrolyte in non-aqueous electrolyte secondary batteries. Examples of such a solvent include: cyclic carbonates such as ethylene carbonate, propylene carbonate, butylene carbonate, and vinylene carbonate; and chain carbonates such as dimethyl carbonate, methylethyl carbonate, and diethyl carbonate. In particular, a mixed solvent of the cyclic carbonate and chain carbonate is preferable.

In the present invention, the solute of the non-aqueous electrolyte may be any lithium salt that is generally used as a solute in non-aqueous electrolyte secondary batteries. Examples of such a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof.

According to the present invention capacity degradation due to charge-discharge cycles can be reduced and charge-discharge cycle performance improved.

DETAILED DESCRIPTION OF THE PREFERRED EMBODIMENTS

Hereinbelow, preferred embodiments of the present invention are described by way of examples thereof. However, the present invention is not limited to the following examples, but various changes and modifications are possible unless such changes and variations depart from the scope of the invention.

Figure 1:
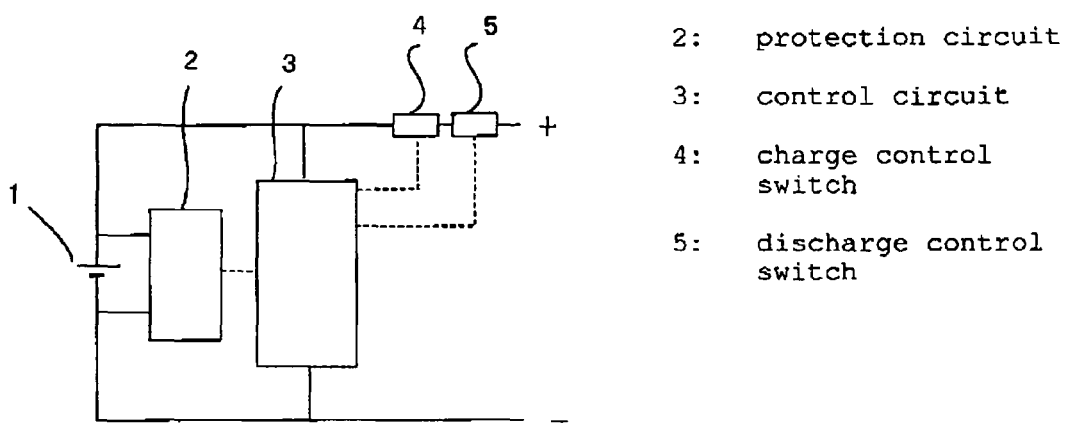
FIG. 1 is a schematic view illustrating a protection circuit and a control circuit of a non-aqueous electrolyte secondary cell.

FIG. 1 is a schematic view illustrating a control circuit and a protection circuit in the case where a non-aqueous electrolyte secondary cell is used alone. A non-aqueous electrolyte secondary cell 1 is provided with a protection circuit 2. The protection circuit 2 monitors the voltage and temperature of the non-aqueous electrolyte secondary cell 1 to prevent the non-aqueous electrolyte secondary cell 1 from being discharged excessively. A control circuit 3 is provided within the secondary cell or within an apparatus using the secondary cell. The control circuit 3 monitors the voltage of the secondary cell 1 and controls its charging and discharging by starting or ending the charge and discharge of the non-aqueous electrolyte secondary cell using a charge control switch 4 and a discharge control switch 5.

Figure 2:
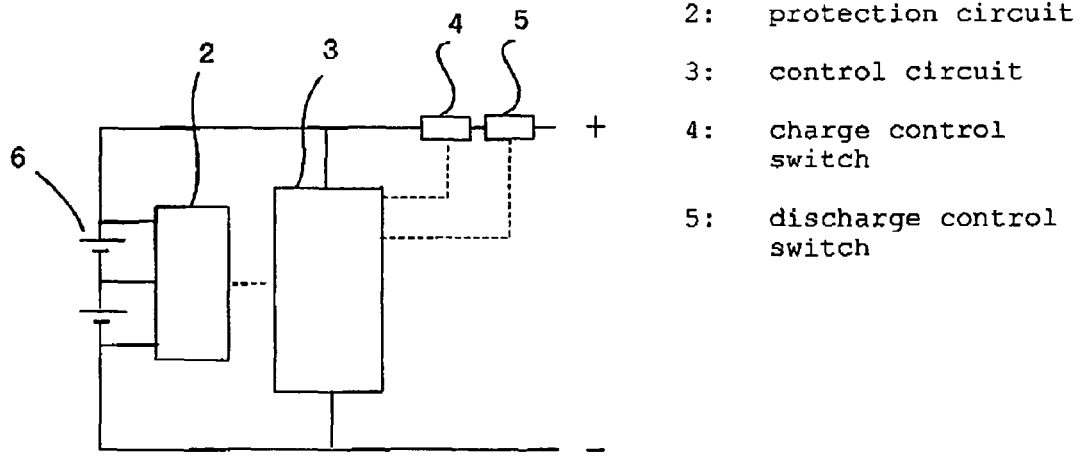
FIG. 2 is a schematic view illustrating a protection circuit and a control circuit for an assembled battery having a plurality of cells each being the non-aqueous electrolyte secondary cell.

FIG. 2 is a schematic view illustrating a protection circuit and a control circuit provided for an assembled battery 6 in which a plurality of the non-aqueous electrolyte secondary cells are combined to serve as cells. The assembled battery 6 is provided with a protection circuit 2. The protection circuit 2 has functions to monitor the voltage and temperature of each of the cells in the assembled battery 6 and to protect the cells from overdischarging and the like. A control circuit 3 is incorporated within the assembled battery or within an apparatus using the assembled battery 6. The control circuit 3 monitors the voltage of the assembled battery 6 and controls charge and discharge of the assembled battery 6 using a charge control switch 4 and a discharge control switch 5. The method of controlling discharge of the assembled battery 6 using the control circuit 3 may be either a control method in which discharge of all the cells is stopped when the voltage of one of the cells in the assembled battery 6 reaches a predetermined voltage, or a control method in which, by monitoring an overall voltage of the assembled battery 6, discharge of all the cells is stopped when the voltage reaches a predetermined voltage. In the case where the overall voltage of the assembled battery is monitored, the voltage of one of the cells may become lower than the predetermined voltage, i.e., the end-of-discharge voltage before the overall voltage of the assembled battery reaches the predetermined voltage since the performance of the cells may vary from one to another. If this happens, controlling is carried out by the protection circuit 2 so that the discharge voltage of each cell does not become less than 2.9 V. Specifically, in the case where the control circuit 3 monitors the overall voltage of the assembled battery 6, the overdischarge-detection voltage of the protection circuit 2 for each cell is set to be equal to or higher than 2.9 V.

Control circuits useful in the present invention are known in the art and include those described in U.S. Pat. Nos. 6,396,246 and 6,492,791, which are incorporated herein by reference. Protection circuits useful in the present invention are also known in the art and include those described in U.S. Pat. Nos. 6,051,955 and 6,340,880, which are incorporated herein by reference.

EXPERIMENT 1

EXAMPLE 1

Preparation of Positive Electrode Active Material

LiOH and a coprecipitated hydroxide represented as $Mn_{0.33}Ni_{0.33}Co_{0.34}(OH)_2$ were mixed with an Ishikawa-type Raikai mortar so that the mole ratio of Li and the total of the transition metals became 1:1, then heat-treated at 1000° C. for 20 hours in an air atmosphere, and thereafter, the mixture was pulverized. Thus, a lithium-transition metal complex oxide represented as $LiMn_{0.33}Ni_{0.33}Co_{0.34}O_2$ having an average particle diameter of about 5 μm was obtained.

Preparation of Positive Electrode

The positive electrode active material prepared in the above-described manner, carbon as a conductive agent, poly (vinylidene fluoride) as a binder, and N-methyl-2-pyrrolidone as a dispersion medium were mixed so that the weight ratio of the active material, the conductive agent, and the binder became 90:5:5, and the mixture was thereafter kneaded to obtain a positive electrode slurry. The slurry thus prepared was coated on an aluminum foil serving as a current collector and then dried; thereafter, the current collector was rolled using reduction rollers, and current collector tabs were attached thereto. Thus, a positive electrode was prepared.

Preparation of Negative Electrode

An artificial graphite as a negative electrode active material and a styrene-butadiene rubber as a binder were added to an aqueous solution in which carboxymethylcellulose, which is a thickening agent, was dissolved into water so that the weight ratio of the active material and the binder and the thickening agent became 95:3:2, and the mixture was thereafter kneaded to obtain a negative electrode slurry. The slurry thus prepared was coated on a copper foil serving as a current collector, and then dried; thereafter, the current collector was rolled using reduction rollers, and current collector tabs were attached thereto. Thus, a negative electrode was prepared.

Preparation of Electrolyte Solution $LiPF_6$ was dissolved in a solvent in which ethylene carbonate (EC) and ethyl methyl carbonate (EMC) were mixed at a volume ratio of 3:7 so that the concentration of $LiPF_6$ became 1 mole/liter. An electrolyte solution was thus prepared.

Preparation of Cell

The positive electrode and the negative electrode were wound so as to face each other with a separator interposed therebetween to prepare a wound assembly. In a glove box under an argon atmosphere, the wound assembly as well as the electrolyte solution were enclosed into a container made of aluminum laminate. A non-aqueous electrolyte secondary cell A1 was thus obtained, with a cell standard size as follows: a thickness of 3.6 mm, a width of 3.5 cm, and a length of 6.2 cm.

Evaluation of Charge-Discharge Cycle Performance

The non-aqueous electrolyte secondary cell A1 was charged with a constant current of 650 mA at room temperature until the voltage reached 4.2 V, further charged with a constant voltage of 4.2 V until the current value reached 32 mA, and thereafter discharged at a constant current of 650 mA until the voltage reached 3.1 V. This charge and discharge process was repeated to measure the charge-discharge cycle performance of the cell.

EXAMPLE 2

A non-aqueous electrolyte secondary cell A2 was prepared in the same manner as in Example 1. In the evaluation of the charge-discharge cycle performance, the cell A2 was charged in the same manner as with Example 1 and thereafter discharged at a constant current of 650 mA until the voltage reached 2.9 V. The charge-discharge cycle performance of the non-aqueous electrolyte secondary cell A2 was thus measured.

COMPARATIVE EXAMPLE 1

A non-aqueous electrolyte secondary cell XA1 was prepared in the same manner as in Example 1. The amount of $LiMn_{0.33}Ni_{0.33}Co_{0.34}O_2$ contained in the cell XA1 was 4.455 g. The non-aqueous electrolyte secondary cell XA1 was charged with a constant current of 650 mA at room temperature until the voltage reached 4.2 V and further charged at a constant voltage of 4.2 V until the current value reached 32 mA to measure its initial charge capacity. The initial charge capacity was found to be 795.9 mAh. Thereafter, the cell was discharged with a constant current of 650 mA until the voltage reached 2.75 V to measure its initial discharge capacity. The initial discharge capacity was found to be 638.0 mAh.

Next, in the evaluation of charge-discharge cycle performance, the cell was charged in the same manner as in Example 1, and thereafter discharged with a constant current of 650 mA until the voltage reached 2.75 V. The charge-discharge cycle performance of the non-aqueous electrolyte secondary cell XA1 was thus measured.

COMPARATIVE EXAMPLE 2

A non-aqueous electrolyte secondary cell XA2 was prepared in the same manner as in Example 1. In the evaluation of charge-discharge cycle performance, the cell was charged in the same manner as in Example 1, and thereafter discharged with a constant current of 650 mA until the voltage reached 2.5 V. The charge-discharge cycle performance of the non-aqueous electrolyte secondary cell XA2 was thus measured.

COMPARATIVE EXAMPLE 3

A non-aqueous electrolyte secondary cell XA3 was prepared in the same manner as in Example 1. In the evaluation of charge-discharge cycle performance, the cell was charged in the same manner as in Example 1, and thereafter discharged with a constant current of 650 mA until the voltage reached 2.0 V. The charge-discharge cycle performance of the non-aqueous electrolyte secondary cell XA3 was thus measured.

COMPARATIVE EXAMPLE 4

Preparation of $LiCoO_2$

LiOH and $Co(OH)_2$ were mixed using an Ishikawa-type Raikai mortar so that the mole ratio of Li and Co became 1:1. The mixture was heat-treated at 1000° C. for 20 hours in an air atmosphere and thereafter pulverized to obtain $LiCoO_2$ having an average particle diameter of about 5 μm A non-aqueous electrolyte secondary cell XB1 was prepared in the same manner as in Example 1 except that $LiCoO_2$ thus prepared was used as the positive electrode active material in the preparation of the positive electrode, and the charge-discharge cycle performance of the non-aqueous electrolyte secondary cell XB1 was measured in the same manner as in Example 1.

COMPARATIVE EXAMPLE 5

A non-aqueous electrolyte secondary cell XB2 was prepared in the same manner as in Comparative Example 4, and the charge-discharge cycle performance of the non-aqueous electrolyte secondary cell XB2 was measured in the same manner as in Comparative Example 1.

Figure 3:
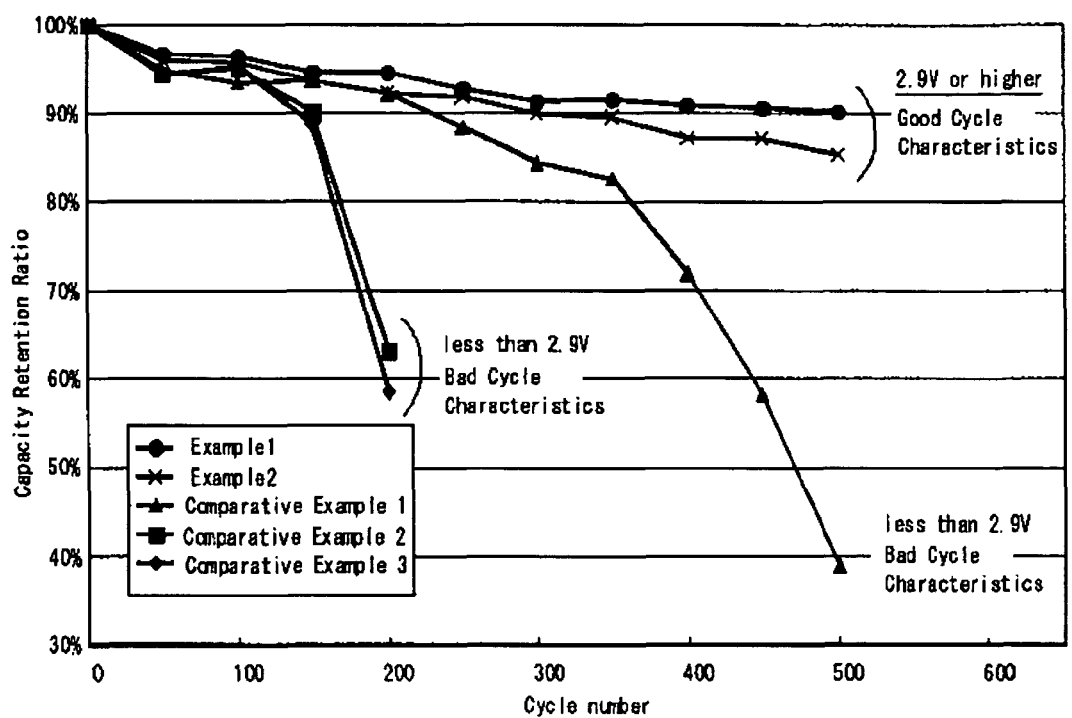
FIG. 3 is a graph showing charge-discharge cycle performance in Examples 1 and 2 as well as Comparative Examples 1 to 3.

The evaluation results of the charge-discharge cycle performance of the above-described Examples 1 and 2 as well as Comparative Examples 1 to 5 are shown in Table 1 and FIG. 3. With the cells XA2 and XA3, their tests were stopped at the 200 th cycle because noticeable capacity decreases were observed at the 200 th cycle.

TABLE 1

| | Cell | Positive electrode active material | End-of-discharge voltage | Capacity retention ratio at 200th cycle | Capacity retention ratio at 500th cycle |
|---|---|---|---|---|---|
| Ex. 1 | A1 | $LiMn_{0.33}Ni_{0.33}Co_{0.34}O_2$ | 3.1 V | 94.7% | 90.2% |
| Ex. 2 | A2 | $LiMn_{0.33}Ni_{0.33}Co_{0.34}O_2$ | 2.9 V | 92.4% | 85.4% |
| Comp. Ex. 1 | XA1 | $LiMn_{0.33}Ni_{0.33}Co_{0.34}O_2$ | 2.75 V | 92.3% | 38.9% |
| Comp. Ex. 2 | XA2 | $LiMn_{0.33}Ni_{0.33}Co_{0.34}O_2$ | 2.5 V | 63.2% | — |
| Comp. Ex. 3 | XA3 | $LiMn_{0.33}Ni_{0.33}Co_{0.34}O_2$ | 2.0 V | 58.6% | — |
| Comp. Ex. 4 | XB1 | $LiCoO_2$ | 3.1 V | 84.5% | 77.9% |
| Comp. Ex. 5 | XB2 | $LiCoO_2$ | 2.75 V | 89.5% | 85.8% |

As shown in Table 1 and FIG. 3, setting the end-of-discharge voltage to be equal to or higher than 2.9 V can improve the charge-discharge cycle performance remarkably. From a comparison between Comparative Example 4 and Comparative Example 5, it will be appreciated that the effect of improvement in the charge-discharge cycle performance cannot be obtained even when the end-of-discharge voltage is set to be equal to or higher than 2.9V if the cell uses the positive electrode active material $LiCoO_2$ having a higher initial charge-discharge efficiency than that of the negative electrode. From this fact it follows that the advantageous effect of the present invention is obtained with a battery in which the initial charge-discharge efficiency of the positive electrode active material is lower than that of the negative electrode.

Hence, it is clear that with the non-aqueous electrolyte secondary cell of the present invention or the assembled battery having a plurality of cells each being the secondary cell, its charge-discharge cycle performance can be improved remarkably when the end-of-discharge voltage of the secondary cell or the cells in the assembled battery is controlled so as to be 2.9 V or higher by a control circuit that is incorporated either in the secondary cell or the assembled battery, or in an apparatus using the secondary cell or the assembled battery.

EXPERIMENT 2

In order to study the cause of the degradation in the charge-discharge cycle performance in the foregoing Comparative Examples 1 to 3, the cells of Examples 1 and 2 as well as those of Comparative Examples 1 to 3 that were subjected to the charge-discharge cycle test were disassembled, and the positive electrodes and the negative electrodes were analyzed.

1. Analysis of Positive Electrode

Figure 4:
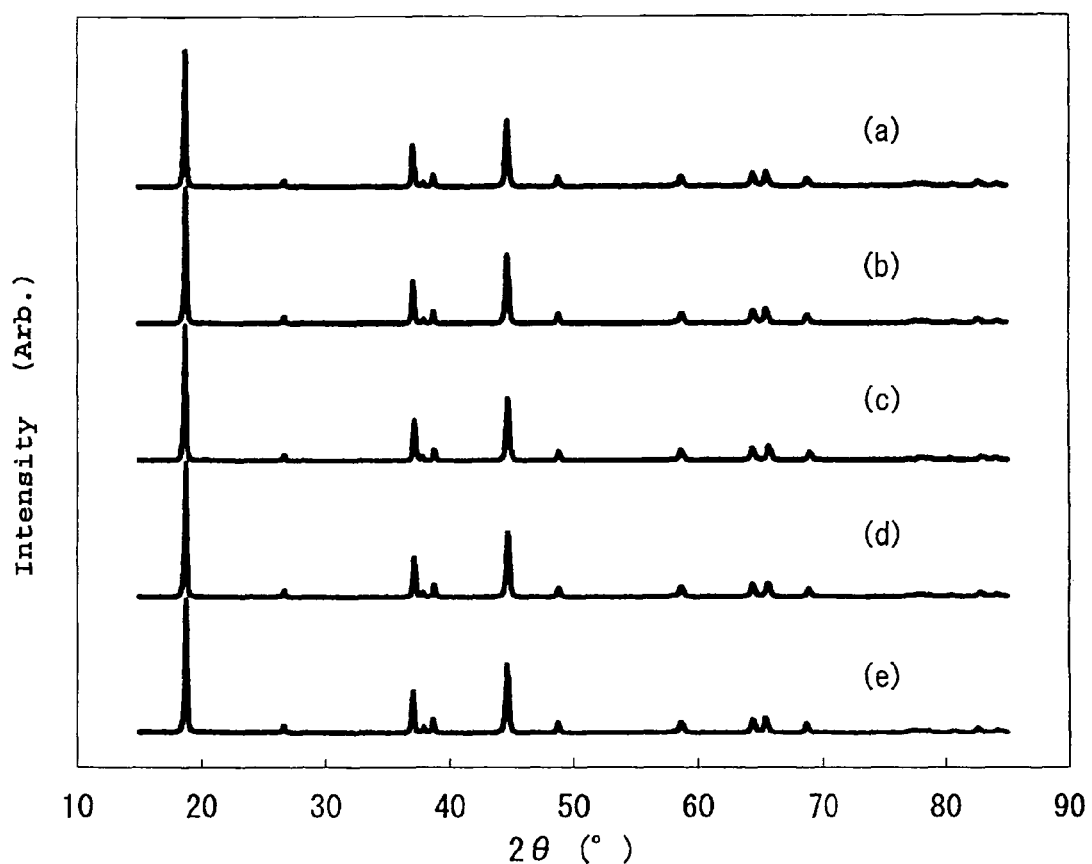
FIG. 4 is a graph illustrating X-ray diffraction patterns of the positive electrodes of Examples 1 and 2 as well as Comparative Examples 1 to 3.

The cells of Examples 1 and 2 as well as Comparative Examples 1 to 3 were disassembled to take out their positive electrodes, and the positive electrodes were subjected to X-ray diffraction using CuKα as the radiation source. The results are shown in FIG. 4. In FIG. 4, the line (a) represents Example 1, the line (b) represents Example 2, the line (c) represents Comparative Example 1, the line (d) represents Comparative Example 2, and the line (e) represents Comparative Example 3. In addition, the lattice constants of the positive electrodes were obtained, and also the full widths of half maximum thereof were calculated using the Gaussian method. The results are shown in Table 2.

TABLE 2

| | Cell | End-of-discharge voltage | Lattice constant | | Full width of half maximum | |
|---|---|---|---|---|---|---|
| | | | a axis (Å) | c axis (Å) | 003 plane | 110 plane |
| Ex. 1 | A1 | 3.1 V | 2.853 | 14.236 | 0.139 | 0.256 |
| Ex. 2 | A2 | 2.9 V | 2.852 | 14.222 | 0.145 | 0.264 |
| Comp. Ex. 1 | XA1 | 2.75 V | 2.854 | 14.231 | 0.133 | 0.266 |
| Comp. Ex. 2 | XA2 | 2.5 V | 2.854 | 14.239 | 0.130 | 0.261 |
| Comp. Ex. 3 | XA3 | 2.0 V | 2.854 | 14.243 | 0.147 | 0.265 |

As clearly seen from FIG. 4, not much difference was observed in the X-ray diffraction patterns between the positive electrodes of the cells having an end-of-discharge voltage of 2.9 V or higher, which showed superior charge-discharge cycle performance, and the positive electrodes of the cells having an end-of-discharge voltage of less than 2.9 V, which showed inferior charge-discharge cycle performance. Moreover, not much difference was observed in the lattice constants and the full widths of half maximum of the positive electrodes of the five cells of Examples 1 and 2 as well as Comparative Examples 1 to 3. The information about bulk crystal structure can be obtained by X-ray diffraction; therefore, it is appreciated that there was little variation in the bulk structures of the crystals of the positive electrode active materials between the positive electrodes of the cells having an end-of-discharge voltage of 2.9 V or higher and the positive electrodes of the cells having an end-of-discharge voltage of less than 2.9 V.

2. Analysis of Negative Electrode

The cells of Examples 1 and 2 as well as Comparative Examples 1 to 3 were disassembled to take out their negative electrodes, which were then subjected to X-ray fluorescence analysis using rhodium as a radiation source to measure how much transition metal was dissolved into the solvent and deposited on the negative electrode surface. The detection range was 0-40 keV. The results are shown in Table 3.

TABLE 3

| | Cell | End-of-discharge voltage | Transition metal detected (cps/μA) | | |
|---|---|---|---|---|---|
| | | | Mn | Co | Ni |
| Ex. 1 | A1 | 3.1 V | 0.187 | 0 | 0 |
| Ex. 2 | A2 | 2.9 V | 0.579 | 0 | 0 |
| Comp. Ex. 1 | XA1 | 2.75 V | 1.001 | 0 | 0 |
| Comp. Ex. 2 | XA2 | 2.5 V | 0.989 | 0 | 0 |
| Comp. Ex. 3 | XA3 | 2.0 V | 0.864 | 0 | 0 |

As clearly seen from Table 3, when the end-of-discharge voltage was 2.9 V or higher, the amounts of Mn detected on the negative electrodes were small; on the other hand, when the end-of-discharge voltage was less than 2.9 V, large amounts of Mn were detected on the negative electrodes. Although the reason is not clearly understood, it is believed that a large amount of Mn was deposited on the negative electrode for the following reason.

Specifically, since the potential of the positive electrode reduces in the final stage of discharge, part of $Mn^{4+}$ in the positive electrode is reduced to $Mn^{3+}$, which is unstable. $Mn^{3+}$ causes disproportionation, forming $Mn^{4+}$ and $Mn^{2+}$. Because $Mn^{2+}$ tends to form a complex compound with, and easily dissolve into, the solvent in the electrolyte solution, it dissolves from the positive electrode surface into the solvent, depositing on the negative electrode.

As shown in Table 3, neither Ni nor Co was detected from the negative electrode surface. This demonstrates that the degradation in charge-discharge cycle performance due to the dissolution of Mn from the positive electrode surface is unique to lithium-transition metal complex oxides containing Mn.

EXPERIMENT 3

Verification was conducted about whether or not the cell of Comparative Example 1 falls within the scope of the method proposed in Japanese Unexamined Patent Publication No. 5(1993)-290890. Specifically, the value x in $Li_xMn_{0.33}Ni_{0.33}Co_{0.34}O_2$ thereof during charge and discharge was calculated.

With the cell of Comparative Example 1, the value x in $Li_xMn_{0.33}Ni_{0.33}Co_{0.34}O_2$ at the end of initial charge and that at the end of initial discharge were obtained; the results were: x=0.357 at the end of charge and x=0.872 at the end of discharge. The value x is small during charge but becomes large during discharge. In addition, during the charge-discharge cycle test that follows, charge and discharge are carried out under the same conditions as those in the initial charge and discharge. Therefore, the positive electrode cannot be charged or discharged beyond the range; that is, the cell is not charged until the value x becomes less than 0.357, and the cell is not discharged until the value x becomes greater than 0.872.

This proves that the value x of the cell of Comparative Example 1 falls within the range specified in Japanese Unexamined Patent Publication No. 5(1993)-290890. Hence, the method proposed by Japanese Unexamined Patent Publication No. 5(1993)-290890 does not have advantageous effects to improve the charge-discharge cycle performance of the batteries according to the present invention.

EXPERIMENT 4

Verification was conducted to confirm whether or not the cell of Comparative Example 1 was the one proposed in Japanese Unexamined Patent Publication No. 7(1995)-153494.

Figure 5:
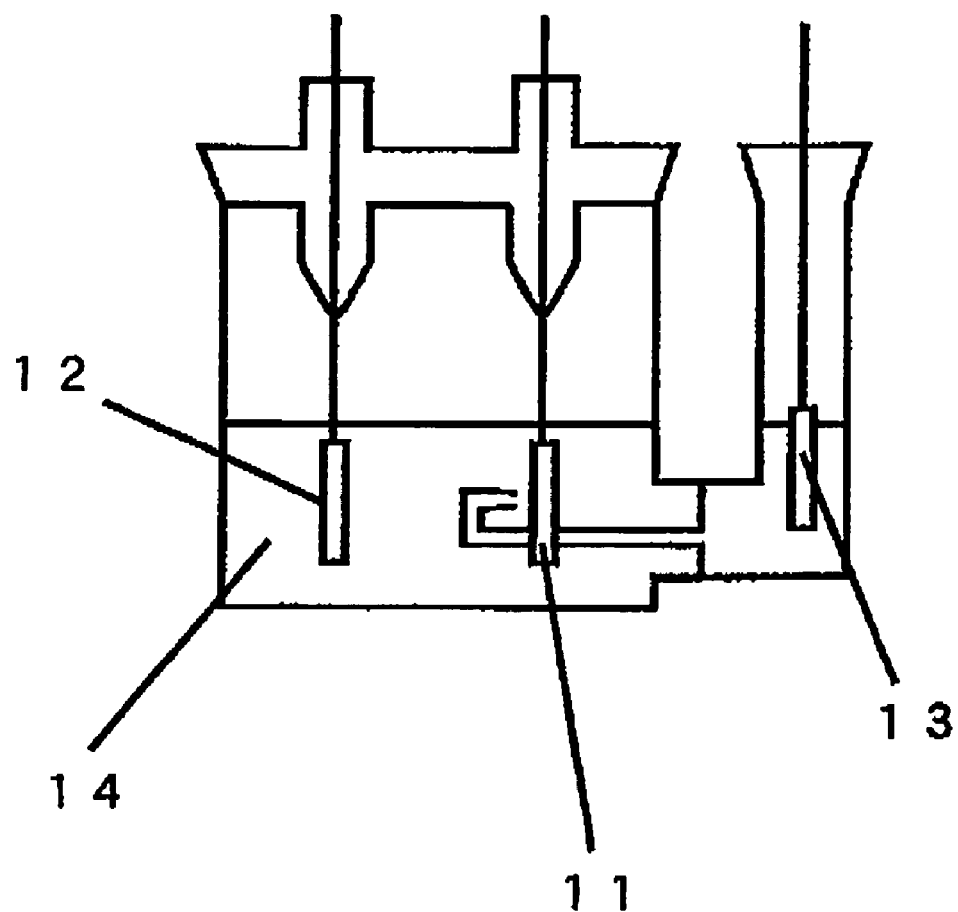
FIG. 5 is a schematic view illustrating a three-electrode beaker cell.

A three-electrode beaker cell as illustrated in FIG. 5 was prepared using the positive electrode adopted in the cell of Comparative Example 1 as its working electrode and using the same electrolyte solution as that of the cell of Comparative Example 1. In FIG. 5, reference numeral 11 denotes a working electrode, reference numeral 12 denotes a counter electrode, reference numeral 13 denotes a reference electrode, and reference numeral 14 denotes an electrolyte solution. Lithium metal was used for the counter electrode 12 and the reference electrode 13. The initial charge-discharge efficiency of the positive electrode measured was 86%. Next, a three-electrode beaker cell as illustrated in FIG. 5 was prepared using the same negative electrode as that of the cell of Comparative Example 1 as its working electrode and using the same electrolyte solution as that of Comparative Example 1 to measure the initial charge-discharge efficiency. The resultant value was 94%.

From the foregoing, it is appreciated that the positive electrode of the cell of Comparative Example 1 has a lower initial charge-discharge efficiency than that of the negative electrode. This proves that the method proposed in Japanese Unexamined Patent Publication No. 7(1995)-153494 does not have advantageous effects to improve the charge-discharge cycle performance of the cells according to the present invention.

Only selected embodiments have been chosen to illustrate the present invention. To those skilled in the art, however, it will be apparent from the foregoing description that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A method of controlling charge and discharge of a non-aqueous secondary cell comprising a positive electrode including a positive electrode active material containing a lithium-transition metal complex oxide having a layered structure and containing at least Ni and Mn as transition metals, and a negative electrode containing a carbon material as a negative electrode active material and having an initial charge-discharge efficiency higher than that of the positive electrode, and an assembled battery having a plurality of cells each being said secondary cell, said method comprising: controlling discharge of the secondary cell or each of the cells in the assembled battery so that the end-of-discharge voltage of the secondary cell or each of the cells is 2.9 V or higher.

2. The method according to claim 1, wherein the discharge of the secondary cell or each of the cells in the assembled battery is controlled by a control circuit incorporated in the secondary cell or the assembled battery, or in an apparatus using the secondary cell or the assembled battery.

3. The method according to claim 2, wherein the secondary cell or the assembled battery is provided with a protection circuit for preventing overdischarge of the secondary cell or the assembled battery with an overdischarge-detection voltage, and the overdischarge-detection voltage for the secondary cell or each of the cells in the assembled battery is set at a value equal to or higher than 2.9 V and equal to or lower than the end-of-discharge voltage controlled by the control circuit.

4. The method according to claim 2, wherein the control circuit monitors a voltage of each of the cells in the assembled battery and controls its discharge.

5. The method according to claim 3, wherein the control circuit monitors an overall voltage of the assembled battery and controls discharge of each of the cells in the assembled battery so that the end-of-discharge voltage of each of the cells results in 2.9 V or higher by setting the overdischarge-detection voltage of the protection circuit for each of the cells to be 2.9 V or higher.

6. The method according to claim 1, wherein the lithium-transition metal complex oxide is represented by the chemical formula $Li_aMn_xNi_yCo_zO_2$, wherein a, x, y, and z satisfy $0 \leq a \leq 1.2$, $x+y+z=1$, $0 < x \leq 0.5$, $0 < y \leq 0.5$, and $z \geq 0$.

7. The method according to claim 1, wherein the amount of nickel (Ni) and the amount of manganese (Mn) are substantially equal in the lithium-transition metal complex oxide.

8. The method according to claim 1, wherein the carbon material of the negative electrode active material is a graphite material.

9. A charge-discharge controlling device for controlling charge and discharge of either a non-aqueous secondary cell including a positive electrode composed of a positive electrode active material containing a lithium-transition metal complex oxide having a layered structure and containing at least Ni and Mn as transition metals, and a negative electrode containing a carbon material as a negative electrode active material and having an initial charge-discharge efficiency higher than that of the positive electrode, or an assembled battery having a plurality of cells each being said secondary cell, said charge-discharge controlling device comprising:
- a charge control switch for starting or ending charge of the secondary cell or each of the cells in the assembled battery;
- a discharge control switch for starting or ending discharge of the secondary cell or each of the cells in the assembled battery; and
- a control circuit, incorporated in the secondary cell or assembled battery, or in an apparatus using the secondary cell or assembled battery, for supplying a signal to the discharge control switch such that an end-of-discharge voltage of the secondary cell or each of the cells in the assembled battery is 2.9 V or higher.

10. The charge-discharge controlling device according to claim 9, further comprising a protection circuit provided in the secondary cell or the assembled battery for preventing overdischarge of the secondary cell or the assembled battery with an overdischarge-detection voltage, wherein the overdischarge-detection voltage for the secondary cell or for each of the cells in the assembled battery is set at a value equal to or lower than the end-of-discharge voltage controlled by the control circuit and equal to or higher than 2.9 V.

11. The charge-discharge controlling device according to claim 9, wherein the control circuit monitors a voltage of each of the cells in the assembled battery and controls its discharge.

12. The charge-discharge controlling device according to claim 10, wherein the control circuit monitors an overall voltage of the assembled battery, and controls discharge of each of the cells in the assembled battery by setting an overdischarge-detection voltage of the protection circuit for each cell at 2.9 V or higher so that the end-of-discharge voltage of each cell is 2.9 V or higher.

13. The charge-discharge controlling device according to claim 9, wherein the lithium-transition metal complex oxide is represented by the chemical formula $Li_aMn_xNi_yCo_zO_2$, wherein a, x, y, and z satisfy $0 \leq a \leq 1.2$, $x+y+z=1$, $0 < x \leq 0.5$, $0 < y \leq 0.5$, and $z \geq 0$.

14. The charge-discharge controlling device according to claim 9, wherein the amount of nickel (Ni) and the amount of manganese (Mn) are substantially equal in the lithium-transition metal complex oxide.

15. The charge-discharge controlling device according to claim 9, wherein the carbon material of the negative electrode active material is a graphite material.

* * * * *